(12) United States Patent
Lalithambika et al.

(10) Patent No.: US 7,551,460 B2
(45) Date of Patent: Jun. 23, 2009

(54) SWITCH MODE POWER SUPPLY CONTROLLERS

(75) Inventors: Vinod A. Lalithambika, Cambridge (GB); Devarahandi Indika Mahaesh de Silva, Cambridge (GB); Jayaraman Kumar, Cambridge (GB); Gehan Amaratunga, Cambridge (GB)

(73) Assignee: Cambridge Semiconductor Limited (GB)

( * ) Notice: Subject to any disclaimer, the term of this patent is extended or adjusted under 35 U.S.C. 154(b) by 228 days.

(21) Appl. No.: 11/445,476

(22) Filed: Jun. 1, 2006

(65) Prior Publication Data

US 2007/0274112 A1 Nov. 29, 2007

(30) Foreign Application Priority Data

May 23, 2006 (GB) .................................... 0610208

(51) Int. Cl.
*H02M 3/335* (2006.01)
(52) U.S. Cl. ..................... 363/21.16; 363/41; 323/286
(58) Field of Classification Search ............. 363/21.16, 363/21.12, 21.13, 21.15, 12.18, 21.02, 21.03, 363/41, 97; 323/286
See application file for complete search history.

(56) References Cited

U.S. PATENT DOCUMENTS

| 4,672,516 | A |   | 6/1987 | Ney et al. |
| 5,831,839 | A | * | 11/1998 | Pansier ................... 363/21.16 |
| 5,901,052 | A |   | 5/1999 | Strijker |
| 5,940,281 | A |   | 8/1999 | Wolf |
| 6,301,135 | B1 |   | 10/2001 | Mammano et al. |
| 6,333,624 | B1 |   | 12/2001 | Ball et al. |
| 6,373,726 | B1 |   | 4/2002 | Russell |
| 6,385,059 | B1 |   | 5/2002 | Telefus et al. |
| 6,590,789 | B2 |   | 7/2003 | Bailly |
| 6,707,283 | B1 |   | 3/2004 | Ball |
| 6,721,192 | B1 |   | 4/2004 | Yang et al. |
| 6,836,415 | B1 |   | 12/2004 | Yang et al. |
| 6,862,198 | B2 |   | 3/2005 | Muegge et al. |
| 6,882,552 | B2 |   | 4/2005 | Telefus et al. |
| 6,900,995 | B2 |   | 5/2005 | Muegge et al. |
| 6,956,750 | B1 |   | 10/2005 | Eason et al. |
| 6,958,920 | B2 |   | 10/2005 | Mednik et al. |

(Continued)

FOREIGN PATENT DOCUMENTS

WO 97/13314 A1 4/1997

(Continued)

OTHER PUBLICATIONS

"UK Search Report corresponding GB 0610208.1"(Jul. 12, 2007). 1 pg.

(Continued)

*Primary Examiner*—Akm E Ullah
*Assistant Examiner*—Harry Behm
(74) *Attorney, Agent, or Firm*—Schwegman, Lundberg, & Woessner, P.A.

(57) ABSTRACT

This invention relates to switch mode power supply (SMPS) controllers employing primary side sensing. We describe an (SMPS) controller which uses an area correlator to compare an area under a feedback signal waveform between a start point defined by said first timing signal and an end point defined by said second timing signal with a reference area. An output of the area correlator provides an error signal for regulating the SMPS output.

26 Claims, 6 Drawing Sheets

U.S. PATENT DOCUMENTS

| | | |
|---|---|---|
| 6,972,969 B1 | 12/2005 | Shteynberg et al. |
| 6,977,824 B1 | 12/2005 | Yang et al. |
| 6,985,368 B2 | 1/2006 | Park |
| 7,016,204 B2 | 3/2006 | Yang et al. |
| 7,027,312 B2 | 4/2006 | Park |
| 7,248,487 B1 * | 7/2007 | Indika de Silva et al. ... 363/21.18 |
| 2002/0015315 A1 | 2/2002 | Telefus |
| 2005/0024898 A1 | 2/2005 | Yang et al. |
| 2005/0073862 A1 | 4/2005 | Mednik et al. |
| 2005/0169017 A1 | 8/2005 | Muegge et al. |
| 2005/0276083 A1 | 12/2005 | Berghegger |
| 2005/0285587 A1 | 12/2005 | Yang et al. |
| 2006/0034102 A1 | 2/2006 | Yang et al. |
| 2006/0050539 A1 | 3/2006 | Yang et al. |
| 2006/0055433 A1 | 3/2006 | Yang et al. |
| 2006/0056204 A1 | 3/2006 | Yang et al. |
| 2007/0121349 A1 | 5/2007 | Mednik et al. |
| 2007/0133234 A1 | 6/2007 | Huynh et al. |
| 2007/0274106 A1 | 11/2007 | Coulson et al. |
| 2007/0274107 A1 * | 11/2007 | Garner et al. ............ 363/21.12 |
| 2008/0037294 A1 * | 2/2008 | Indika de Silva et al. 363/21.12 |

FOREIGN PATENT DOCUMENTS

| | | |
|---|---|---|
| WO | 03/047079 A2 | 6/2003 |
| WO | 2004/051834 A1 | 6/2004 |
| WO | 2004/082119 A2 | 9/2004 |
| WO | 2004/112226 A1 | 12/2004 |
| WO | WO-2004/112227 A1 | 12/2004 |
| WO | WO-2004/112229 A1 | 12/2004 |
| WO | WO-2005/011095 A1 | 2/2005 |
| WO | WO-2005/048442 A1 | 5/2005 |

OTHER PUBLICATIONS

"UK Search Report for GB 0610211.5", (Jul. 12, 2007). 1 pg.

"PCT Application No. PCT/GB2007/050233, International Search Report mailed Sep. 27, 2007", 2 pgs.

Schrüfer, E., *Elektrische Meßtechnik: Messung elektrischer und michtelektrischer Größen*, Carl Hanser Verlag, München, (1983), 299-300.

"U.S. Appl. No. 11/445,473, Response filed Oct. 20, 2008 to Non Final Office ACtion mailed Jul. 18, 2008", 12.

"U.S. Appl. No. 11/445,473 Non-Final Office Action mailed Jul. 18, 2008", OARN, 12pgs.

* cited by examiner

SWITCH MODE POWER SUPPLY CONTROLLERS

RELATED APPLICATION

This application claims priority under 35 U.S.C. 119 from United Kingdom Application No. 0610208.1 filed 23 May 2006, which application is incorporated herein by reference.

FIELD OF THE INVENTION

This invention generally relates to switch mode power supply (SMPS) controllers and to related methods, and more particularly to SMPS controllers employing primary side sensing by area-based techniques.

BACKGROUND TO THE INVENTION

Broadly speaking in a switch mode power supply a magnetic energy storage device such as a transformer or inductor is used to transfer power from an input side to an output side of the SMPS. A power switch switches power to the primary side of the energy storage device, during which period the current and magnetic field builds up linearly. When the switch is opened the magnetic field (and secondary side current) decreases substantially linearly as power is drawn by the load on the output side.

An SMPS may operate in either a discontinuous conduction mode (DCM) or in continuous conduction mode (CCM) or at the boundary of the two in a critical conduction mode. In this specification we are particularly concerned with DCM operating modes in which, when the switching device is turned off, the output voltage steadily, but gradually, declines until a point is reached on the knee of the output curve at which substantially zero output current flows an the inductor or transformer begins to ring, entering a so-called oscillatory phase. The period of the ringing is determined by the inductance and parasitic capacitance of the circuit. In this specification DCM includes so-called critical (discontinuous conduction) mode (CRM) operation in which the power switch is turned on again at the first trough of the oscillatory phase (sometimes referred to as the flyback oscillation). Operation in CRM can be particularly efficient by reducing losses associated with the power switch turn-off transition.

Often the output voltage of an SMPS is regulated by sensing circuitry on the output side, coupled back to the input side of the SMPS by means of an opto-isolator. However some improved techniques employ primary side sensing or, more generally, sensing employing an auxiliary winding on the magnetic energy storage device, or in some related circuits an auxiliary winding of an output filter inductor.

Some background prior art relating to primary side sensing can be found in U.S. Pat. Nos. 6,958,920; 6,721,192; US2002/015315; WO 2005/048442; WO 2004/051834; US2005/0024898; US2005/0169017; U.S. Pat. Nos. 6,956, 750; 6,862,198; US 2006/0056204; U.S. Pat. No. 7,016,204; US 2006/0050539; US 2006/0055433; US 2006/0034102; U.S. Pat. Nos. 6,862,198; and 6,836,415. Still further background prior art can be found in U.S. Pat. No. 6,385,059, US20050276083, U.S. Pat. Nos. 6,977,824, 6,956,750, 6,900,995, WO2004082119, U.S. Pat. No. 6,972,969, WO03047079, U.S. Pat. No. 6,882,552, WO2004112227, US 2005285587, WO2004112226, WO2005011095, U.S. Pat. Nos. 6,985,368, 7,027,312, 6,373,726, 4,672,516, 6,301,135, 6,707,283, and 6,333,624.

Figure 1:
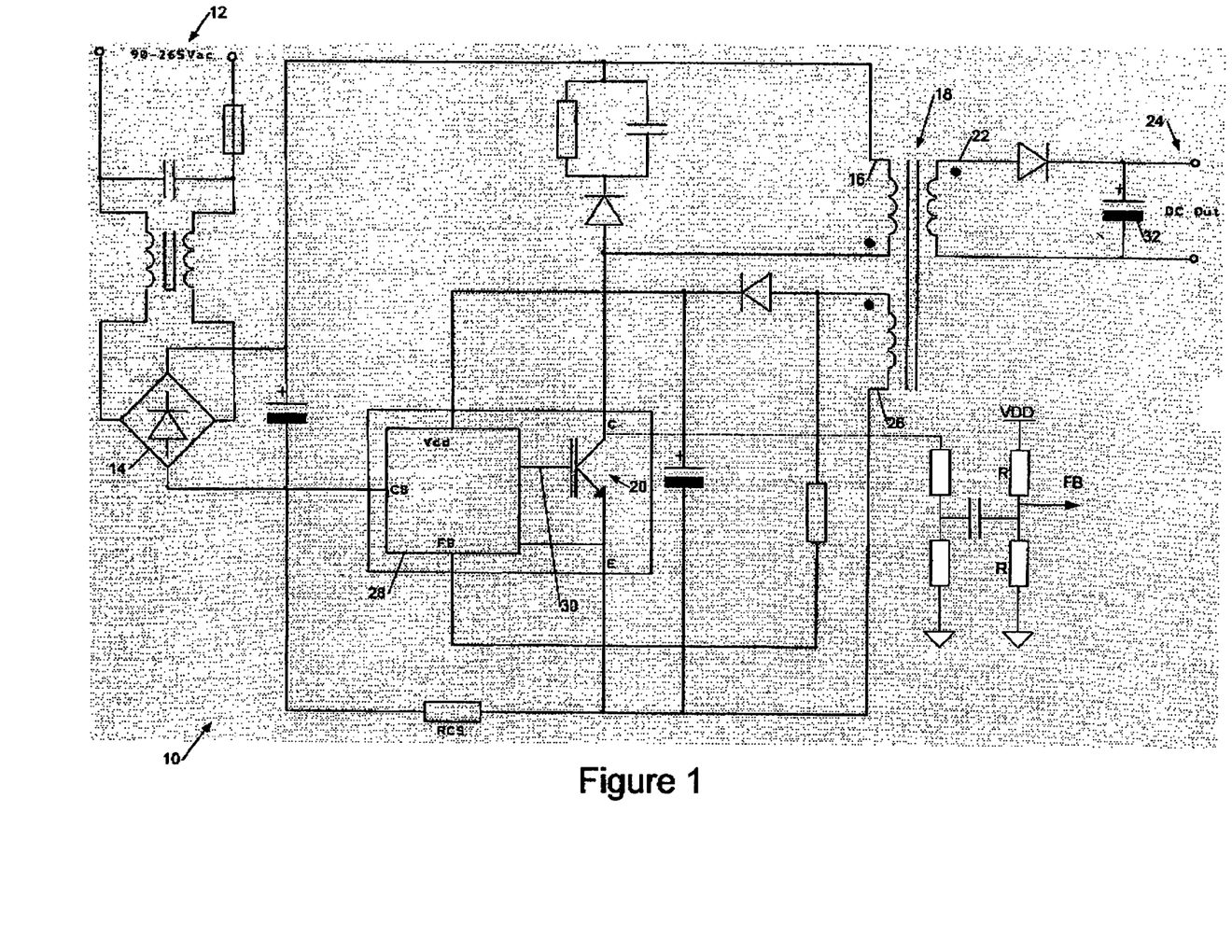
FIG. 1 shows an example of a primary side sensing switch mode power supply circuit.

Referring now to FIG. 1, this shows an example of a switch mode power supply circuit 10 with primary side sensing. The power supply comprises an AC mains input 12 coupled to a bridge rectifier 14 to provide a DC supply to the input side of the power supply. This DC supply is switched across a primary winding 16 of a transformer 18 by means of a power switch 20, in this example an insulated gate bipolar transistor (IGBT). A secondary winding 22 of transformer 18 provides an AC output voltage which is rectified to provide a DC output 24, and an auxiliary winding 26 provides a feedback signal voltage proportionally to the voltage on secondary winding 22. This feedback signal provides an input to a control system 28, powered by the rectified mains. The control system provides a drive output 30 to the power switching device 20, modulating pulse width and/or pulse frequency to regulate the transfer of power through transformer 18, and hence the voltage of DC output 24. In embodiments the power switch 20 and controller 28 may be combined on a single power integrated circuit.

As can be seen, the primary side controlled SMPS of FIG. 1 derives feedback information from the primary side of the transformer, using an auxiliary winding to avoid high voltage signals, the voltage being stepped down by the turns ratio of the transformer. As the skilled person will appreciate, however, it is not necessary to employ a separate auxiliary winding although this may be convenient if such a winding is already contemplated to provide a low voltage supply to the controller. For example, a voltage of the primary winding may be sensed, preferably capacitor coupled so that it can be referenced to the ground of the controller, and stepped down using a potential divider. An example circuit for this is shown inset in FIG. 1, with a dashed connection to the primary winding 16. The skilled person will further appreciate that an auxiliary winding is not necessary to provide a dc supply for the controller as this may be derived from the high voltage dc supply on the primary side of the SMPS or in a number of other ways, for example using a capacitor charge pump driven via a diode from the switched voltage on the power switch. In some preferred implementations, therefore, the auxiliary winding is omitted.

We will describe techniques for using the auxiliary voltage waveform to generate feedback information for regulating an SMPS. In embodiments this facilitates operation across a wide range of input and output conditions.

SUMMARY OF THE INVENTION

In a first aspect the invention therefore provides a switch mode power supply (SMPS) controller for regulating the output of a discontinuous conduction mode SMPS in response to a feedback signal from a winding of a magnetic energy storage device forming part of an output circuit of said SMPS, said feedback signal having an oscillatory portion when substantially no energy is being transferred to said SMPS output, the SMPS controller comprising: a feedback signal input to receive said feedback signal waveform, said feedback signal waveform being responsive to a voltage on said winding; a first timing signal generator to identify a first reference point in the feedback signal waveform; a second timing signal generator coupled to said feedback signal input to identify a second point located in said oscillatory portion of said feedback signal waveform and having an output to provide a second timing signal responsive to said identification; an area correlator coupled to said feedback signal input, to said first and second timing signal generators, said area correlator being configured to compare an area under said feedback signal waveform between a start point defined by said first timing signal and an end point defined by said second timing signal with a reference and having an output to provide an error signal responsive to said comparison; and a controller output coupled to said area correlator output.

In some embodiments the controller further comprises a reference level input to receive an output voltage reference level signal; and the first timing signal generator comprises a first comparator coupled to the reference level input and to the feedback signal input and having an output responsive to a comparison of the reference level signal and feedback signal waveform. In this way the integration may be started at a point in the feedback signal waveform determined by comparison of the waveform with a reference dependent on the desired output voltage of the SMPS. Integration to the second point on the waveform then determines an area which, if the comparison identified a knee point on the waveform (at which the secondary voltage had just fallen to zero) is equal to the area under a quarter of a cycle of a sine wave. Thus by comparing the actual integrated area with this reference area an error signal can be generated to indicate whether the actual secondary voltage is above or below (or equal to) the desired target. In embodiments the reference area depends on the desired target output voltage, since this sets the amplitude of the aforementioned sine wave.

In some other embodiments the first timing signal generator is configured to identify (a time of) the knee point, in which case the integration provides a value for the area (the area under a quarter of a cycle of a sine wave) which depends on the amplitude of the sine wave, and hence on the desired target output voltage. Thus again the measured area can be compared with a reference to determine whether the SMPS output voltage is above, below, or equal to the target. In this case the integration can be thought of as an indirect method of measuring the amplitude of the waveform at the knee point.

The knee point may be found using a range of techniques including, but not limited to, those following: Using a flux reset point detector (which may comprise an integrator which integrates the feedback signal waveform), as described further below with reference to FIG. 5 and in the assignee's co-pending patent application Ser. No. 11/455,482 filed on the same day as this application, inventors including David Coulson, Mahesh de Silva, David Garner, Jay Kumar, [SLWK ref: 1365.114US1], titled "Switch Mode Power Supply Controllers," hereby incorporated by reference in its entirety. Using a slope detector to detect when the feedback waveform departs from an approximately linearly decrease and begins falling rapidly as the oscillatory portion of the waveform commences, as described further in the assignee's co-pending patent application Ser. No. 11/445,473, titled "Switch Mode Power Supply Controllers," filed on the same day as this application, inventors including David Coulson, David Garner, and John Piper [SLWK ref: 1365.112US1], hereby incorporated by reference in its entirety. Effectively counting backwards in time by a quarter of a cycle from the first zero-crossing of the waveform after its linearly decaying portion (which may be implemented using a shift register to capture a quarter cycle history of the waveform), in a similar way to that described in, for example, U.S. Pat. No. 6,900,995 (hereby incorporated by reference in its entirety).

In some embodiments (in either of the above discussed cases) the area correlator comprises an integrator with inputs from the feedback signal waveform and from a second reference level signal, to provide an output responsive to integration of difference between the feedback signal waveform and this second reference level. In embodiments the feedback signal waveform may be scaled and the second reference level signal may be subtracted from the scaled feedback signal waveform prior to integration, as described further below.

Preferably the integration begins at the start point defined by the output of the first comparator; in embodiments this output re-sets the integrator. The integrator may then integrate continuously being re-set at any convenient later point and the output of the integrator sampled based on the timing signal. Alternatively the integration may be stopped at a point defined by the timing signal, in which case a variable magnitude or analogue error signal may be generated from the output of the integration. Where the output of the integration is sampled at a point defined by the timing signal, preferably the output of the integrator is digitised to provide a digital error signal; this may be sampled by a latch. The error signal may be digitised by comparing with a reference, for example the output voltage reference level signal mentioned above. It will therefore be appreciated that the error signal may be either analogue or digital and may convey information for regulating the SMPS based on either the magnitude or the timing of this signal.

In embodiments the output of the controller comprises a demand signal which indicates a power demand from the output of the SMPS. This may either be provided by the error signal itself or by a processed version of the error signal. The skilled person will appreciate that the controller output may be an internal output in an SMPS. In particular the controller output will generally be employed to control either or both of the pulse width and pulse frequency of any oscillator driving a power switch in the SMPS switching power to a primary side of the energy storage device for transferring power from the input to the output side of the SMPS. In embodiments the controller, oscillator and power switch are all integrated together on a single integrated circuit die.

In an economical implementation of the above described controller the feedback signal waveform is scaled by a potential divider and the integrator is configured to integrate a difference between this scaled waveform and the second reference level, for example using an operational amplifier. The potential divider is configured to scale the feedback waveform such that when the integrator integrates a quarter of a cycle of a sine wave starting at the second reference level the output of the integrator is substantially zero. Thus the start point is on the decaying part of the feedback waveform prior to the oscillatory portion of the waveform, and the end point is a defined position on the oscillatory portion of the waveform, in particular a zero-crossing. Thus the area correlator, more particularly the integrator, correlates (integrates) over an end portion of the decaying part of the decaying part of the feedback signal waveform and an initial quarter cycle of the post-conduction resonance that occurs. Therefore, the timing signal generator comprises a second comparator to identify a zero-crossing point in the oscillatory portion of the feedback signal waveform, in particular by comparison with a zero level.

In a related aspect the invention provides a switch mode power supply (SMPS) controller for regulating the output of a discontinuous conduction mode SMPS in response to a feedback signal from a primary or auxiliary winding of a magnetic energy storage device forming part of an output circuit of said SMPS, said feedback signal having an oscillatory portion when substantially no energy is being transferred to said SMPS output, the SMPS controller comprising: a reference level input to receive an output voltage reference level signal; an feedback signal input to receive said feedback signal, said feedback signal having a waveform responsive to a voltage on said winding; a first comparator coupled to said feedback signal input and having an output responsive to a comparison of a signal derived from said feedback signal waveform with a reference to determine a first reference time;

a second comparator coupled to said feedback signal input to compare said feedback signal waveform with a zero reference level to identify a zero-crossing of said oscillatory portion of said feedback signal waveform and having an output to provide a timing signal responsive to said identification; and a regulation signal generator coupled to said feedback signal input, to said first and second comparator outputs and to an integration reference level responsive to said output voltage reference level signal and including integrator to integrate a difference between a version of said feedback signal waveform and said integration reference level, said regulation signal generator having an output to provide a regulation signal responsive to said integration between said first reference time and a second reference time determined by said zero-crossing; and a controller output coupled to said regulation signal generator output.

The reference with which the signal derived from the feedback signal waveform is compared may comprise a signal level, a reference slope (for slope-detection of a knee point), or an integrated signal level (for detecting a flux reset point of the magnetic energy storage device).

The invention further provides a method of regulating the output of a switch mode power supply (SMPS) operating in a discontinuous conduction mode, the method comprising: monitoring a feedback signal waveform from a winding of a magnetic energy storage device forming part of an output signal of said SMPS; comparing an area under said feedback signal waveform, for an interval when a power switching device of said SMPS is off, with a reference area; and regulating said SMPS responsive to said comparison.

As previously mentioned, the feedback signal waveform includes a decaying portion when energy is being transferred from the input side to the output side of the SMPS (this may have minor oscillations superimposed), followed by an oscillatory portion when substantially no energy is being transferred to the SMPS output, the oscillations arising from resonance of the inductance of the magnetic energy storage element with associated capacitances such as parasitic capacitance. Typically the SMPS output side includes a rectifying diode followed by smoothing and the oscillatory portion of the feedback signal waveform begins when the current in the output side through the diode falls to substantially zero.

In some embodiments, therefore, the method includes comparing with the reference area an area under the feedback signal waveform which comprises part of an area under the oscillatory portion of the waveform immediately following the decaying portion of the waveform and which may also include part of an area under the decaying portion of the waveform (if, for example, the area begins at a point set by a comparison of the feedback signal with a target reference level and the actual output voltage is less than a target).

Thus in some embodiments the area under the feedback signal waveform begins at a point in the decaying portion of the waveform defined by comparison of the feedback signal waveform with a reference level dependent upon the desired output, for example the above-mentioned output voltage reference level or a signal dependent upon or proportional to this. However in other embodiments the area under the feedback signal waveform begins at a knee point in the waveform, that is at a transition between the decaying and oscillatory portions of the waveform.

The area under the feedback signal ends at a zero-crossing in the oscillatory portion of the waveform, preferably the first zero-crossing following the decaying portion of the waveform in an embodiment. In this way the reference area may comprise a quarter of a cycle of the oscillatory portion of the feedback signal waveform, in particular a quarter of a cycle beginning at an amplitude defined by the reference level compared with the feedback signal waveform to define the start point of the compared area.

In a further aspect the invention provides a system for regulating the output of a switch mode power supply (SMPS) operating in a discontinuous conduction mode, the system comprising: means for monitoring a feedback signal from a winding of a magnetic energy storage device forming part of an output circuit of said SMPS: means for comparing an area under said feedback signal waveform for an interval when a power switching device of said SMPS is off, with a reference area; and means for regulating said SMPS responsive to said comparison.

In a still further aspect the invention provides a power converter including: a transformer and a switch that electrically couples and decouples the transformer to and from a power source; and a sensing module for correlating an area under a sensing winding flyback voltage waveform of the transformer between two points determined by one or more of a threshold voltage of said flyback voltage waveform, a threshold slope of said flyback voltage waveform, and a point of substantially zero flux in said transformer, with a known non-zero area, both said points being at times when said switch has decoupled said transformer from said power source, to thereby indirectly sense an output voltage of said power converter.

The invention also provides a switch mode power supply including an SMPS controller as described above.

The skilled person will appreciate that the above-described techniques may be employed in a wide variety of SMPS architectures including, but not limited to, a flyback converter and a direct-coupled boost converter. In some implementations the magnetic energy storage device comprises a transformer with primary, secondary, and auxiliary windings but in other implementations an auxiliary winding may be provided on another inductor of the SMPS. In still other implementations an auxiliary winding may be omitted and the sensing signal derived from a primary winding, for example as described above with reference to FIG. 1.

The skilled person will understand that the above-described controllers and methods may be implemented using either analogue or digital circuitry. Thus the invention further provides processor controlled code, in particular on a carrier medium, defining hardware for implementing a controller or method as described above, for example code for setting up or controlling an ASIC or FPGA or code for a hardware description language such as RTL, SystemC or the like.

BRIEF DESCRIPTION OF THE DRAWINGS

These and other aspects of the invention will now be further described, by way of example only, with reference to the accompanying figures in which.

DETAILED DESCRIPTION

We will describe SMPS control systems which can achieve optimum output voltage regulation with primary side feedback while operating across a wide range of input and output conditions.

Broadly speaking we will describe an apparatus and method for extracting SMPS output voltage information from a primary winding on a power transformer of the SMPS. An auxiliary winding on the power transformer provides a waveform to an area correlator. The area correlator compares the area under the auxiliary waveform between two intervals to that of a rectangular waveform area of fixed amplitude defined for the same interval. The start of this interval is defined by a comparator that compares the auxiliary voltage waveform with a reference voltage. A second comparator defines the end of this interval, which is the time of zero crossings of the auxiliary voltage waveform. The area correlator generates an error signal which may be used to regulate the power converter output voltage.

We first describe an operating principle of embodiments of the SMPS controller.

In order to derive feedback information from the auxiliary winding waveform the target operating voltage of the converter and the actual operating voltage of the converter are determined. The method indirectly determines a mismatch between those two voltages by correlating the area under the auxiliary waveform (or part thereof) to that of a known area.

In, for example, a flyback converter, the secondary winding voltage at the end of the secondary current conduction is equal to the output voltage plus the secondary rectifier forward voltage drop. Subsequently the residual energy in the transformer will give rise to an oscillatory voltage waveform whose resonant frequency is defined by the transformer primary inductance and associated parasitic capacitance. The initial amplitude of this oscillatory waveform is equal to the amplitude of the output voltage plus the secondary rectifier forward drop (Vout).

Figure 2:
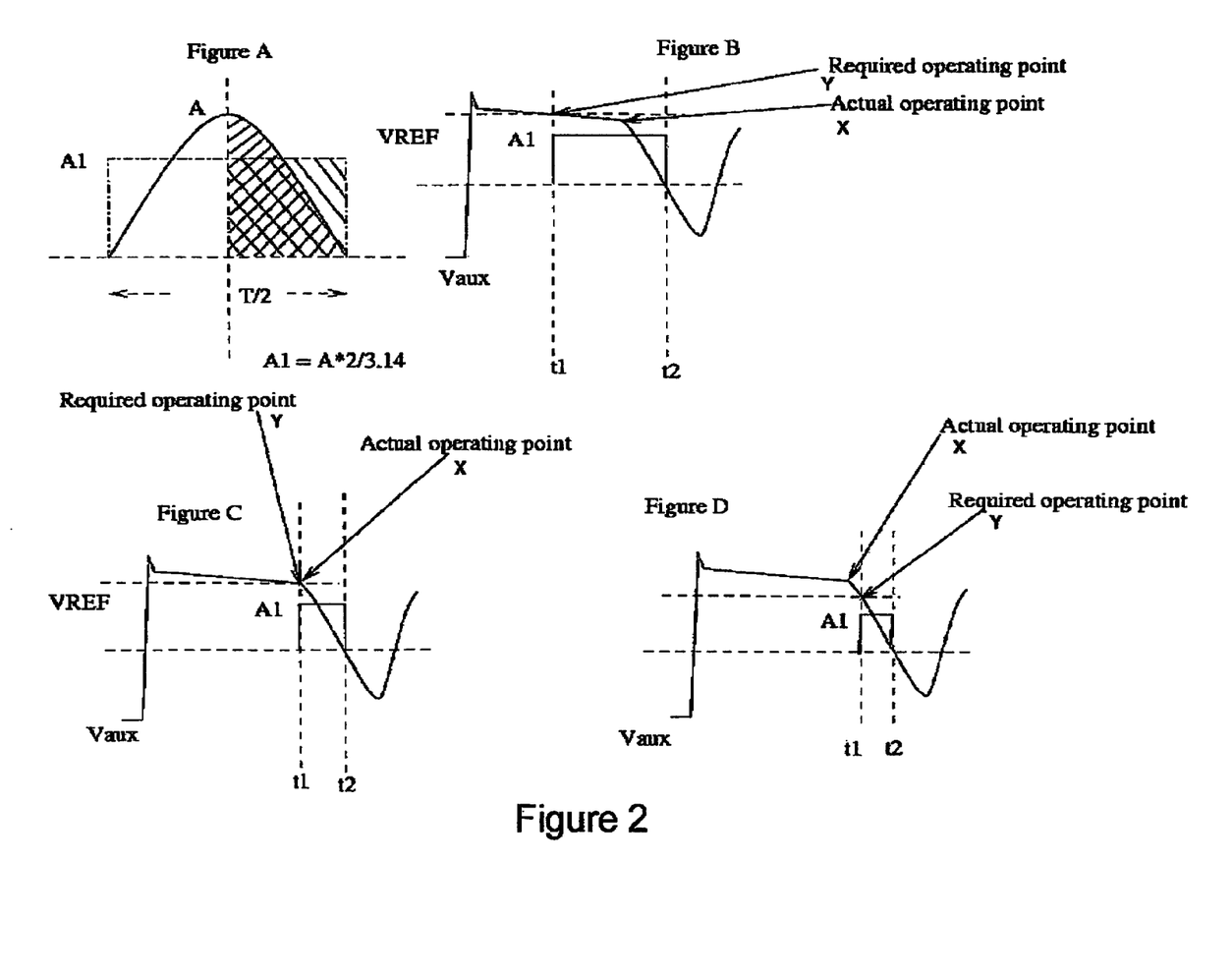
FIG. 2 shows a principle of operation of an area correlator according to an embodiment of the invention.

Referring to FIG. 2, the area under the first quarter cycle of this oscillation, in the auxiliary voltage waveform, will equal to the area under a square wave of same period and with amplitude equal to $2/\pi *$Vout. Therefore, as shown in FIG. 2, if the auxiliary voltage waveform is integrated from the required operating point (i.e Vout=VREF) till the first zero crossing of the auxiliary waveform (i.e for time t2−t1) and compared with the area under a rectangular waveform of amplitude, $2/\pi *$VREF and also defined for the same period of time, we get the error signal that can be used to regulate the power converter output voltage. Alternatively the auxiliary waveform can also be integrated from the actual operating point (knee point) until the first zero crossing of the auxiliary waveform. As mentioned above, the actual operating point (knee point) may be found, for example, by using a change-of-slope detector or by using a flux reset point integrator.

Continuing to refer to FIG. 2, FIG. 2a shows the matching of areas A and A1 over a quarter cycle of a sine wave, so that A1=A*2/3.14. In FIG. 2b (Case 1) the voltage at the actual operating point (X) is lower than that at the required operating point (Y) and so the area under Vaux from t1 to t2 is greater than the area under the rectangular waveform shown. In FIG. 2c (Case 2) the voltage at the actual operating point (X) coincides with that at the required operating point (Y) and so the area under Vaux from t1 to t2 is equal to the area under the rectangular waveform shown. In FIG. 2d (Case 3) the voltage at the actual operating point (X) is higher than that at the required operating point (Y) and so the area under Vaux from t1 to t2 is less than the area under the rectangular waveform shown.

We now describe an implementation of the above described operating principle in an SMPS controller.

Figure 3A:
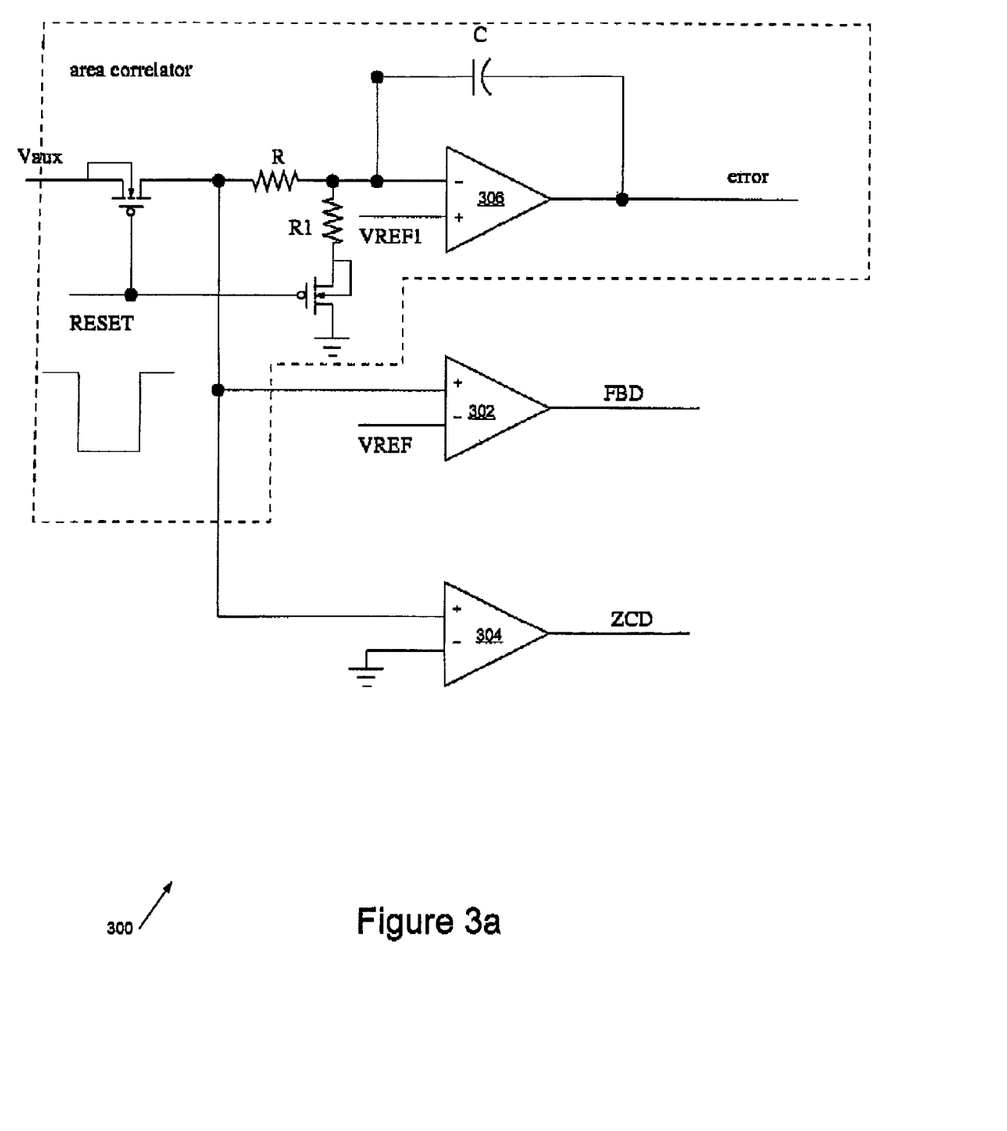
FIGS. 3a and 3b show switch mode power supply controllers in accordance with embodiments of the invention with, respectively, an analogue and a digital output.
Figure 3B:
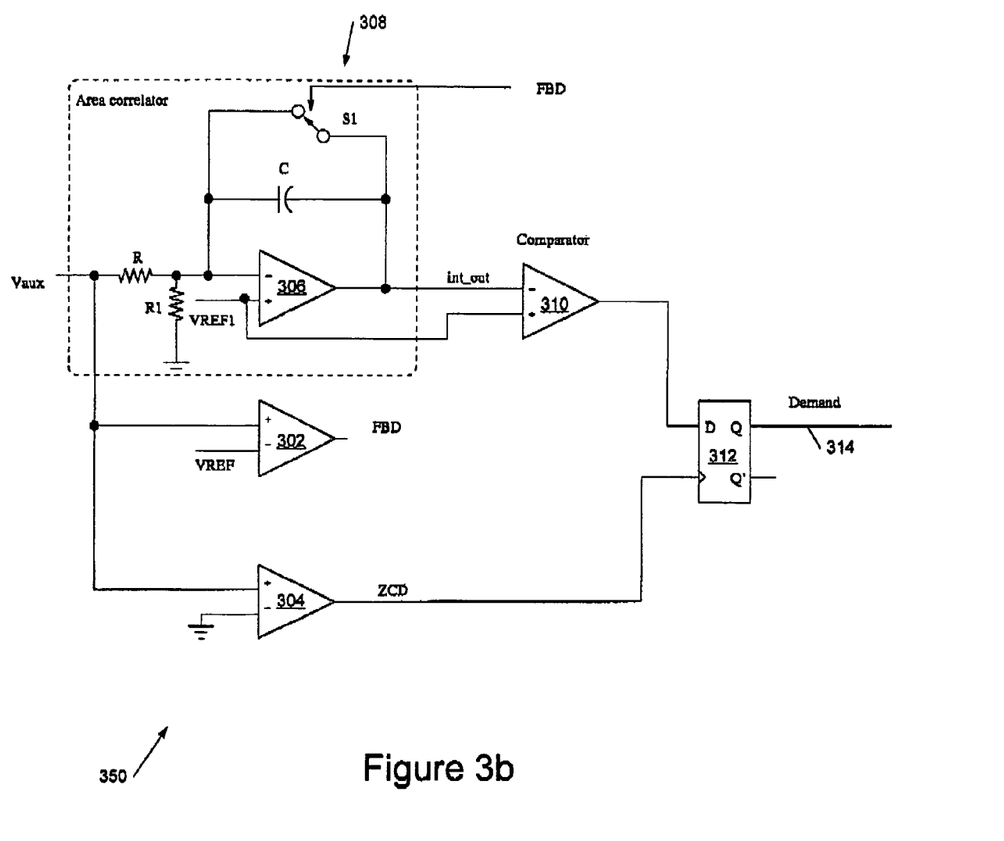
Figure 4:
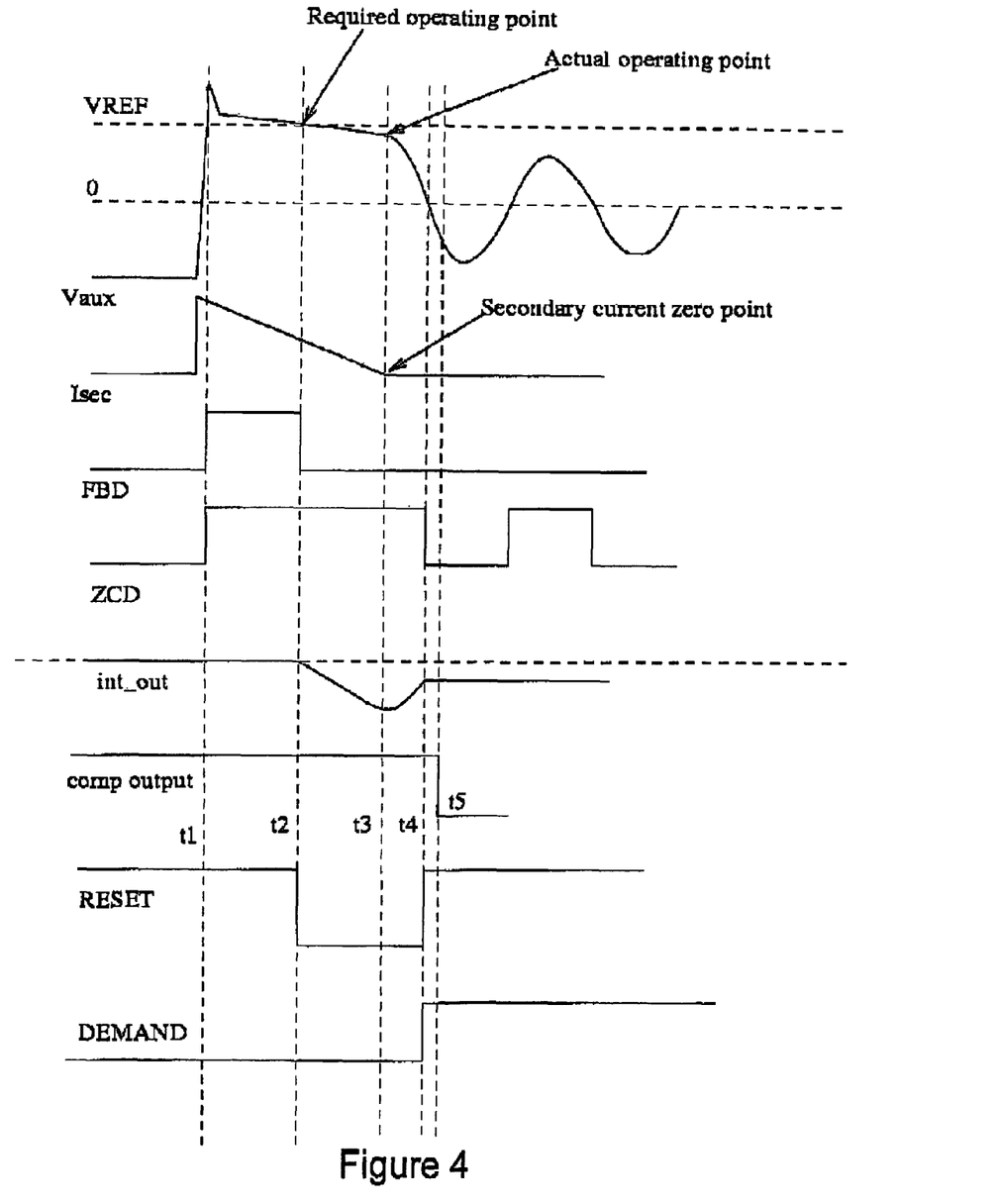
FIG. 4 shows a timing diagram illustrating waveforms for the correlators of FIGS. 3a and 3b.

FIGS. 3a and 3b shows schematic circuit diagrams of embodiments of SMPS controllers 300, 350 to implement the above described technique to generate an error signal for regulating an SMPS output; the relevant timing diagrams are shown in FIG. 4. FIG. 3a show an embodiment for generation of a variable magnitude or analogue error signal and FIG. 3b shows an embodiment that generates a (binary) digital demand signal.

In both the cases the auxiliary voltage (Vaux) from an auxiliary winding is fed to an FBD comparator 302 and to a ZCD comparator 304. The FBD comparator 302 determines the time at which the auxiliary voltage waveform crosses the target operating point by comparing it to reference voltage ($V_{ref}$) and provides output signal FBD. The ZCD comparator 304 determines the times of zero crossing of the auxiliary waveform and provides an output signal ZCD.

An integrator 306 comprising an operational amplifier with a feedback capacitor acts as an area correlator. The output of the integrator provides an error signal. The input to the integrator, Vaux, is scaled by a pair of resistors R, R1 forming a potential divider. The non-inverting input is connected to VREF1 (which may be equal to VREF), which varies with the desired operating point (output voltage). The inverting input is at substantially the same voltage (a form of virtual earth because of the use of an operational amplifier) and therefore a current proportional to the difference between the scaled Vaux and VREF1 flows through the capacitor C. Preferably R and R1 are chosen such that when Vaux defines a quarter cycle of a sine wave the integral of the difference between scaled Vaux and VREF1 is zero.

For the embodiment shown in FIG. 3a, the auxiliary waveform is correlated with a rectangular wave during a period when reset is inactive (low); when reset is active (high) the integrator is reset. As shown in FIG. 4, the reset signal goes inactive when the auxiliary waveform crosses VREF and goes active when the auxiliary waveform next crosses zero. The error generated by the area correlator is negative if the target operating point is greater than the actual operating point and vice versa. If the target operating point and the actual operating points are the same the error is zero.

In the embodiment shown in FIG. 3b, the integrator is reset by switch 308 whenever the FBD signal is high. The integrator starts integrating when the FBD signal goes low. The output of the integrator is fed to a further comparator 310 and compared with the reference voltage VREF1. The comparator out is sampled by latch 312 at the first zero crossing of the auxiliary waveform to generate a demand signal 314.

The DEMAND signal indicates the demand of the converter and, in the embodiment of FIG. 3b, comprises a single bit binary signal. This single bit of information may, for example, be processed using a single bit operated digital algorithm to control the power switch of the converter. For further details reference may be made to the applicant's co-pending applications PCT/GB2005/050244, PCT/GB2005/050242, GB 0513772.4, and GB 0526118.5 (all of which applications are hereby incorporated by reference in their entirety).

The target output voltage for both the above embodiments is given by:

$$\text{Vout}=\pi/2*\text{VREF1}*(1+R/R1) \quad \text{(Equation 1)}$$

We next describe the timing diagram of FIG. 4 in more detail.

A typical discontinuous mode flyback auxiliary voltage waveform (Vaux) is shown at the top of FIG. 4 followed by the secondary current waveform (Isec). The secondary current becomes zero at t=$t_3$. The FBD comparator is high during $t_1$ to $t_2$ period as $V_{aux}$>$V_{ref}$. FBD is used to reset the integrator signal int_out. Therefore the integrator integrates the $V_{aux}$ only from time t=$t_2$ (FBD going low) until time t=$t_4$ (the zero crossing of the $V_{aux}$ waveform, indicated by ZCD). The RESET signal may be generated by using the falling edge of FBD to reset a latch and by using the falling edge of ZCD to set the latch. The DEMAND signal is generated by sampling the comparator output at time t=t4 (the latch of FIG. 3b may be reset at any convenient time—for example the power switch drive signal may be employed to reset the latch).

The controller may implemented at FPGA level for a range of SMPS architectures including, but not limited to the flyback converter architecture discussed.

Figure 5:
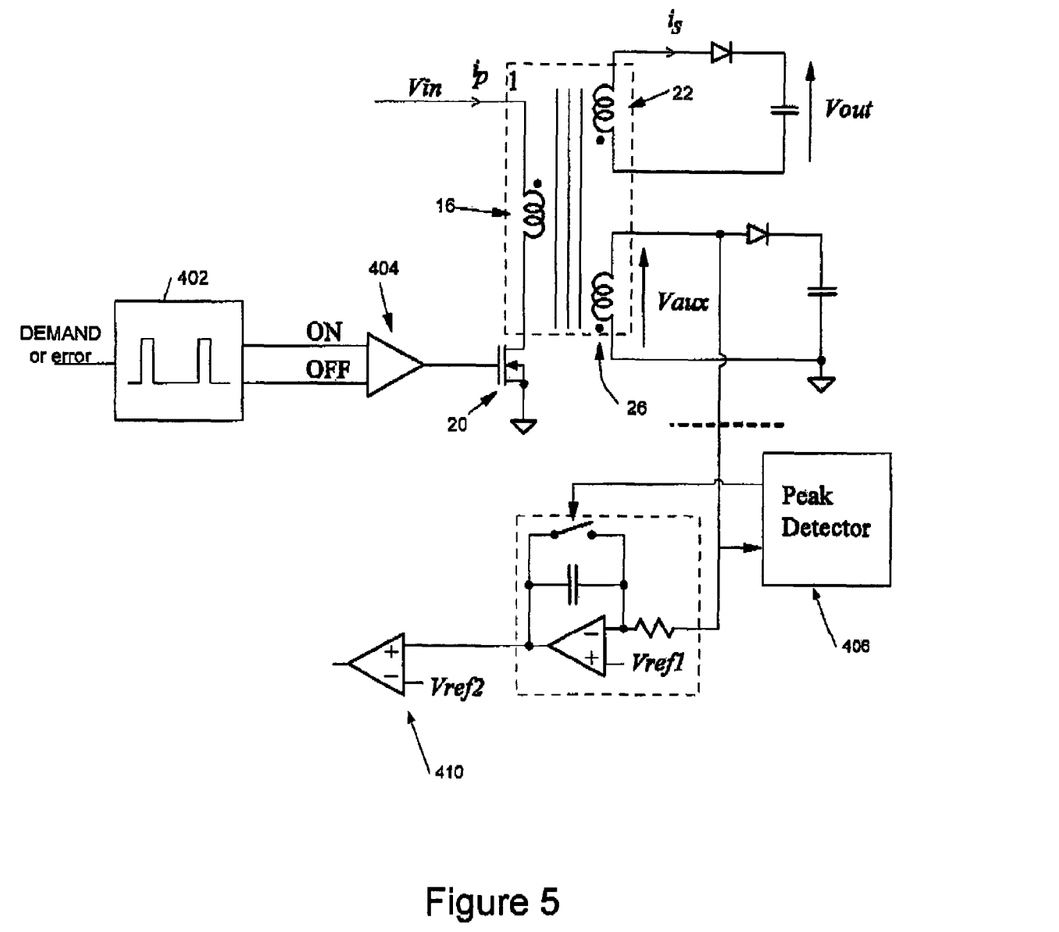
FIG. 5 shows a pulse generator and associated drive circuitry which may be employed with the controllers of FIG. 3 to implement a flyback SMPS converter, and additional circuitry which may be employed to identify a knee point in a sensing signal waveform.

FIG. 5 illustrates a portion of a flyback converter architecture 400 which may include an SMPS controller as described above (compare FIG. 1, in which like elements are indicated by like reference numerals). The flyback converter architecture 400 comprises a flyback transformer having a primary winding 16, a secondary winding 22 and an auxiliary winding 26. The secondary winding is connected to a rectifier and smoothing capacitor to provide the output voltage; the auxiliary winding may similarly be connected to a rectifier and smoothing capacitor to provide power to the control circuitry, as well as providing an auxiliary winding ("primary-side") sensing signal. As shown, the secondary winding is usually physically isolated from the primary and auxiliary windings and their associated components to meet legislative safety requirements. The above DEMAND or error signal may be used to provide an input to a pulse generator 402 which drives a gate driver 404. The pulse generator 402 varies the duty cycle of switching transistor 20 (in this example a MOSFET) by adjusting the timing of the ON and OFF pulses output to the gate driver.

The portion of the flyback converter architecture below the dashed line illustrates one technique for identifying a "knee point" on the auxiliary winding waveform between the decaying and oscillatory (resonant) portions of the waveform. As previously mentioned there are several other techniques which may be employed.

Broadly speaking the circuit of FIG. 5 uses a peak detector 406 to identify a peak (or trough) in the oscillatory portion of the waveform, this corresponding to a point of zero flux in the transformer. This signal is used to reset an integrator 408 to a reset point (Vref1) which integrates (Vaux) until comparator 410, which compares against Vref2 (Vref is equal to Vref1 and both may be equal to zero) to identify when the reset point is again reached. This corresponds to a time in the following cycle when the flux is again zero, after having built up when the power switch is on and decayed during the decaying portion of the feedback signal. Thus the knee point on Vaux is identified.

The techniques we have described provide a stable and accurate way of detecting the feedback error of a primary side sensing SMPS, with a only a small number of components in the feedback loop. No doubt many other effective alternatives will occur to the skilled person. It will be understood that the invention is not limited to the described embodiments and encompasses modifications apparent to those skilled in the art lying within the spirit and scope of the claims appended hereto.

All documents, patents, and other references listed above are hereby incorporated by reference for any purpose.

We claim:

1. A switch mode power supply (SMPS) controller for regulating the output of a discontinuous conduction mode SMPS in response to a feedback signal from a winding of a magnetic energy storage device forming part of an output circuit of said SMPS, said feedback signal having a waveform with a decaying portion representing a decaying voltage in said output circuit of said SMPS followed by an oscillatory portion when substantially no energy is being transferred to said SMPS output, the SMPS controller comprising:

a feedback signal input to receive said feedback signal waveform, said feedback signal waveform being responsive to a voltage on said winding;

a first timing signal generator coupled to said feedback signal input to identify a first reference point in said feedback signal waveform at a transition between said decaying and oscillatory portions of said waveform and having an output to provide a first timing signal responsive to said identification;

a second timing signal generator coupled to said feedback signal input to identify a second point located in said oscillatory portion of said feedback signal waveform and having an output to provide a second timing signal responsive to said identification;

an area correlator coupled to said feedback signal input and to said first and second timing signal generator outputs, said area correlator being configured to compare an area under said feedback signal waveform between a start point defined by said first timing signal and an end point defined by said second timing signal with a reference and having an output to provide an error signal responsive to said comparison; and a controller output coupled to said area correlator output.

2. An SMPS controller as claimed in claim 1 further comprising a reference level input to receive an output voltage reference level signal; and wherein said first timing signal generator comprises a first comparator coupled to said reference level input and to said input, said first timing signal generator output being responsive to a comparison of said reference level signal and said feedback signal waveform.

3. An SMPS controller as claimed in claim 1wherein said area correlator comprises an integrator having inputs from said feedback signal input and from a second reference level signal and having an output responsive to integration of a difference between said feedback signal waveform and said second reference level signal beginning at said start point.

4. An SMPS controller as claimed in claim 3 wherein said feedback signal input to said integrator includes a potential divider to scale said feedback waveform such that said integrator is configured to integrate a difference between said scaled feedback waveform and said second reference level.

5. An SMPS controller as claimed in claim 4 wherein said potential divider is configured to scale said feedback waveform such that when said integrator integrates a feedback waveform comprising a quarter of a cycle of a sine wave starting at said second reference level said integrator output is substantially zero.

6. An SMPS controller as claimed in claim 3 wherein said second reference level signal is dependent upon said output voltage reference level signal.

7. An SMPS controller as claimed in 3 wherein said integrator is responsive to said timing signal to stop integrating; and wherein said error signal has a variable magnitude responsive to a difference between an output voltage of said SMPS and said output voltage reference level signal.

8. An SMPS controller as claimed in claim 3 wherein said error signal comprises a digital signal, and wherein said area correlator further comprises a comparator coupled to integrator output to digitise said error signal.

9. An SMPS controller as claimed in claim 8 further comprising a sampling circuit to sample said digitised error signal responsive to said timing signal to provide a digital demand signal to said controller output indicating a power demand from said SMPS.

10. An SMPS controller as claimed in claim 1 wherein said second timing signal generator comprises a second comparator to identify a zero-crossing point in said oscillatory portion of said feedback signal waveform.

11. An SMPS controller as claimed in claim 1 wherein said winding comprises an auxiliary winding of said magnetic energy storage device.

12. A SMPS including an SMPS controller as claimed in claim 1.

13. A switch mode power supply (SMPS) controller for regulating the output of a discontinuous conduction mode SMPS in response to a feedback signal from a primary or auxiliary winding of a magnetic energy storage device forming part of an output circuit of said SMPS, said feedback signal having an oscillatory portion when substantially no energy is being transferred to said SMPS output, the SMPS controller comprising:
  a reference level input to receive an output voltage reference level signal;
  an feedback signal input to receive said feedback signal, said feedback signal having a waveform responsive to a voltage on said winding;
  a first comparator coupled to said feedback signal input and having an output responsive to a comparison of a signal derived from said feedback signal waveform with a reference slope to determine a first reference time indicative of a commencement of said oscillatory portion of said waveform;
  a second comparator coupled to said feedback signal input to compare said feedback signal waveform with a zero reference level to identify a zero-crossing of said oscillatory portion of said feedback signal waveform and having an output to provide a timing signal responsive to said identification; and
  a regulation signal generator coupled to said feedback signal input, to said first and second comparator outputs and to an integration reference level responsive to said output voltage reference level signal and comprising an integrator to integrate a difference between a version of said feedback signal waveform and said integration reference level, said regulation signal generator having an output to provide a regulation signal responsive to said integration between said first reference time and a second reference time determined by said zero-crossing; and
  a controller output coupled to said regulation signal generator output.

14. An SMPS controller as claimed in claim 13 wherein said integrator is configured to begin integrating at said first reference time and to stop integrating at said second reference time.

15. An SMPS controller as claimed in claim 13 wherein said integrator is configured to begin integrating at said first reference time, and further comprising a latch to sample a result of said integrating at said second reference time to provide said regulation signal.

16. An SMPS controller as claimed in claim 15 wherein said regulation signal generator further comprises a third comparator coupled to an output of said integrator to provide a digitised integrator output to said latch.

17. A SMPS including an SMPS controller as claimed in claim 13.

18. A method of regulating the output of a switch mode power supply (SMPS) operating in a discontinuous conduction mode, the method comprising:
  monitoring a feedback signal waveform from a winding of a magnetic energy storage device forming part of an output signal of said SMPS, said feedback signal waveform including a decaying portion representing a decaying voltage in said output circuit of said SMPS followed by an oscillatory portion when substantially no energy is being transferred to said SMPS output;
  comparing an area under said feedback signal waveform, for an interval when a power switching device of said SMPS is off, with a reference area; and
  regulating said SMPS responsive to said comparison;
  wherein, during said regulating, said area under said feedback signal waveform begins at a transition between said decaying and oscillatory parts of said feedback signal waveform, and wherein said area under said feedback signal waveform comprises part of an area under said oscillatory portion of said waveform.

19. A method as claimed in claim 18 wherein said area under Said feedback signal waveform ends at a zero crossing in said oscillatory portion of said waveform.

20. A method as claimed in claim 19 wherein said area under said feedback signal waveform begins at a point in said decaying portion of said waveform defined by comparison of said feedback signal waveform with a reference level.

21. A method as claimed in claim 18 wherein, during said regulating, said area under said feedback signal waveform comprises part of an area under said decaying portion of said waveform dependent upon a difference between an actual output voltage of said SMPS and a target output voltage of said SMPS.

22. A method as claimed in claim 18 wherein said reference area comprises a quarter cycle of said oscillatory portion of said feedback signal waveform.

23. A system for regulating the output of a switch mode power supply (SMPS) operating in a discontinuous conduction mode, the system comprising:
  means for monitoring a feedback signal waveform from a winding of a magnetic energy storage device forming part of an output circuit of said SMPS, said feedback signal waveform including a decaying portion representing a decaying voltage in said output circuit of said SMPS followed by an oscillatory portion when substantially no energy is being transferred to said SMPS output;
  means for comparing an area under said feedback signal waveform for an interval when a power switching device of said SMPS is off, with a reference area; and
  means for regulating said SMPS responsive to said comparison;
  wherein during said regulating, said area under said feedback signal waveform begins at a transition between said decaying and oscillatory parts of said feedback signal waveform, and wherein said area under said feedback signal waveform comprises part of an area under said oscillatory portion of said waveform.

24. A SMPS including an SMPS controller as claimed in claim 23.

25. A power converter comprising:

a transformer and a switch that electrically couples and decouples the transformer to and from a power source; and a sensing module for correlating an area under a sensing winding flyback voltage waveform of the transformer between two points determined by a threshold slope of said flyback voltage waveform, and a point of substantially zero flux in said transformer, with a known non-zero area, both said points being at times when said switch has decoupled said transformer from said power source, to thereby indirectly sense an output voltage of said power converter.

26. A power converter as claimed in claim 25 wherein said sensing module comprises:

an event detection sub-module for generating a reference voltage timing signal indicating a reference voltage timing point when the sensing winding flyback voltage is equal to a reference voltage;

a sub-module for indicating when said transformer waveform passes through zero voltage starting from said reference voltage timing point; and an area correlator circuit for generating an error signal which indicates whether said output voltage of said power converter is above or below a required value.

* * * * *

UNITED STATES PATENT AND TRADEMARK OFFICE
CERTIFICATE OF CORRECTION

PATENT NO. : 7,551,460 B2  Page 1 of 1
APPLICATION NO. : 11/445476
DATED : June 23, 2009
INVENTOR(S) : Vinod A. Lalithambika et al.

It is certified that error appears in the above-identified patent and that said Letters Patent is hereby corrected as shown below:

On the Title page, in Item (56), under "Other Publications", in column 1, line 1, after "Report" insert -- for --.

In column 10, line 43, in Claim 3, delete "claim lwherein" and insert -- claim 1 wherein --, therefor.

In column 12, line 27, in claim 19, delete "Said" and insert -- said --, therefor.

Signed and Sealed this

Twenty-fifth Day of August, 2009

David J. Kappos
*Director of the United States Patent and Trademark Office*